(12) United States Patent
Sakamoto

(10) Patent No.: US 6,334,600 B1
(45) Date of Patent: Jan. 1, 2002

(54) STEPLESS SLIDE ADJUSTER HAVING A SAFETY LOCK

(75) Inventor: Yutaka Sakamoto, Hiroshima (JP)

(73) Assignee: Delta Tooling Co., Ltd., Hiroshima (JP)

(*) Notice: Subject to any disclaimer, the term of this patent is extended or adjusted under 35 U.S.C. 154(b) by 53 days.

(21) Appl. No.: 09/587,975

(22) Filed: Jun. 6, 2000

(30) Foreign Application Priority Data

Jun. 7, 1999 (JP) .............................. 11-159748

(51) Int. Cl.[7] .............................................. F16M 13/00
(52) U.S. Cl. ...................... 248/424; 248/429; 248/430; 248/900; 297/216.1
(58) Field of Search .............................. 297/216.1, 330; 248/429, 424, 400, 430; 296/63, 64, 65.1

(56) References Cited

U.S. PATENT DOCUMENTS

| 1,088,248 A | * | 2/1914 | Via ........................... 188/70 R |
| 5,727,768 A | * | 3/1998 | Sakamoto .................. 248/429 |
| 5,865,506 A | * | 2/1999 | Sakamoto .............. 297/362.14 |

FOREIGN PATENT DOCUMENTS

| JP | 62-42834 | 11/1987 |
| JP | 62-61462 | 12/1987 |
| JP | 63-46258 | 12/1988 |

* cited by examiner

Primary Examiner—Anita King
Assistant Examiner—Kimberly Wood
(74) Attorney, Agent, or Firm—Wenderoth, Lind & Ponack, L.L.P.

(57) ABSTRACT

A stepless slide adjuster having a safety lock includes a first member and a second member, which can move relatively to each other, a nut fastened to the first member, a screw rotatably attached to the second member and screwed into the nut, a manual locking device for manually locking the screw, and an emergency locking device having a brake drum and brake shoes for emergency locking the screw. The lead angle of the nut and the screw is set to be larger than the friction angle between them. When the locking with the manual locking device is released, and the screw rotates with an acceleration or a speed that exceeds a predetermined value, then the brake shoes spread and frictionally engage the brake drum, thereby impeding a relative movement between the first member and the second member.

6 Claims, 4 Drawing Sheets

STEPLESS SLIDE ADJUSTER HAVING A SAFETY LOCK

BACKGROUND OF THE INVENTION

1. Field of the Invention

The present invention relates generally to a slide adjuster attached to a seat of, for example, an automotive vehicle for adjusting the position of the seat in the longitudinal direction of the automotive vehicle and, in particular but not exclusively, to a stepless slide adjuster having a safety lock, which can adjust the longitudinal position of the seat steplessly and with which the seat can be emergency-locked, while the seat is in an unlocked state, that is, when the locking of the seat is released.

2. Description of the Related Art

A conventional seat sliding device is, for example, the step-sliding seat slide adjuster disclosed in Japanese Patent Publication (examined) No. 62-61462. This adjuster slides the seat while two locking plates alternately engage with a plurality of latches formed in a latch plate, so that one locking plate is always engaging with one of the latches while sliding the seat.

Japanese Utility Model Publication (examined) No. 62-42834 discloses a seat sliding device locking the seat using inertia. In this seat sliding device, locking portions are provided independently at two positions on the left and right sides. One of these locking portions is used as a manual lock when the seat is moved normally, and the other one is an inertial lock, which automatically locks the seat when there is an abrupt change in acceleration or deceleration of the vehicle, such as during a collision of the vehicle.

Japanese Utility Model Publication (examined) No. 63-46258 discloses a locking device for a seat sliding device provided with oblique faces before and behind locking holes, so that the locking plates are easily drawn into the locking holes.

Of the conventional devices mentioned above, the seat slide adjuster disclosed in Japanese Patent Publication No. 62-61462 requires that the seat is moved back and forth while operating the operating lever for one pitch at a time, which makes the operation of the operating lever cumbersome and requires a lot of time for the moving of the seat.

The device disclosed in Japanese Utility Model Publication No. 625-42834 has a mechanism for immediately locking the locking plates with a G-sensor (acceleration sensor), but this does not work during the operation of the locking lever.

In the locking device disclosed in Japanese Utility Model Publication No. 63-46258, when the acceleration of the seat is changed while the position of the seat is being adjusted, there is no guarantee that the locking plates are securely drawn along the oblique faces into the locking holes.

SUMMARY OF THE INVENTION

The present invention has been developed to overcome the above-described disadvantages.

It is accordingly an objective of the present invention to provide an inexpensive stepless slide adjuster having a safety lock, with which the position of a seat provided, for example, in a vehicle can be adjusted swiftly and steplessly, and with which the seat can be reliably emergency-locked while it is in the unlocked state.

In accomplishing the above and other objectives, the stepless slide adjuster having a safety lock according to the present invention includes a first member and a second member, which can move relatively to each other, a nut fastened to the first member, a screw rotatably attached to the second member and screwed into the nut, a manual locking device for manually locking the screw, and an emergency locking device having a brake drum and brake shoes for emergency locking the screw.

In the above-described construction, the lead angle of the nut and the screw is larger than the friction angle therebetween, and when the locking with the manual locking device is released, and the screw rotates with an acceleration or a speed that exceeds a predetermined value, then the brake shoes spread and frictionally engage the brake drum, thereby impeding a relative movement between the first member and the second member.

Because the lead angle of the nut and the screw is larger than the friction angle therebetween, the position of the second member with respect to the first member can be adjusted swiftly and steplessly. Moreover, the second member locks securely when the vehicle body is subjected to a large acceleration due to, for example, a collision of the vehicle while the slide adjuster is in the unlocked state, that is, the locking with the manual locking device has been released.

The stepless slide adjuster further includes a cam fastened to the screw, wherein the brake shoes are caused to spread out by way of the cam.

This construction simplifies the configuration of the emergency locking device, making it possible to provide an inexpensive stepless slide adjuster having a safety lock.

The stepless slide adjuster further includes a plurality of rollers arranged between the brake shoes and the cam.

By this construction, when the screw rotates with a rotational acceleration that is higher than a predetermined value, the brake shoes move slightly in the circumferential direction with respect to the cam, and the brake shoes are spread by the rollers and pushed against the brake drum, so that the screw can be securely emergency-locked.

Conveniently, the manual locking device includes a brake ring fastened to the screw, and a locking member for frictionally engaging with the brake ring.

This construction simplifies the configuration of the manual locking device, making it possible to provide an inexpensive stepless slide adjuster having a safety lock.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

This application is based on application No. 11-159748 filed Jun. 7, 1999 in Japan, the content of which is incorporated hereinto by reference.

Figure 1:
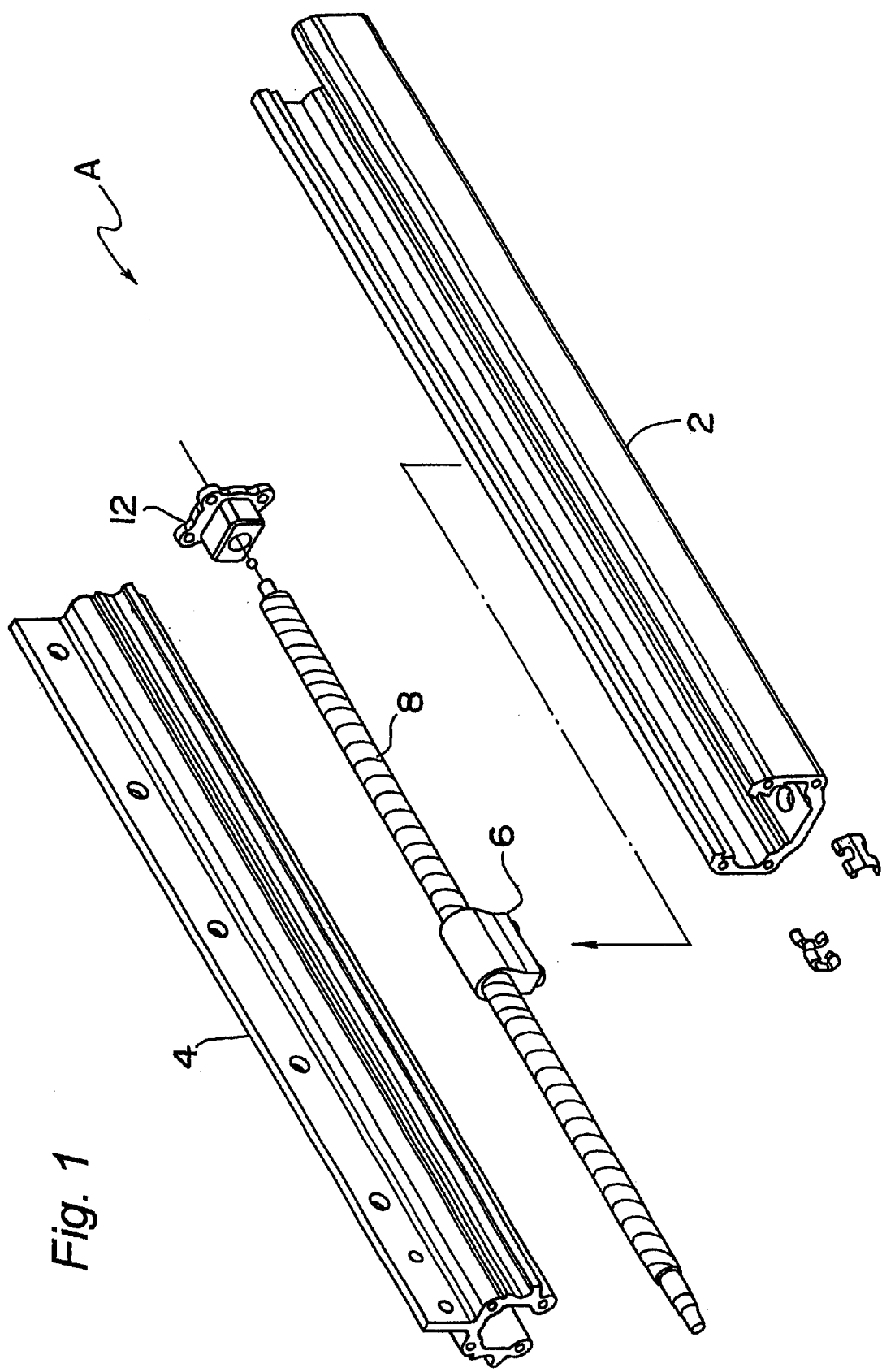
FIG. 1 is an exploded perspective view of a stepless slide adjuster according to the present invention.
Figure 2:
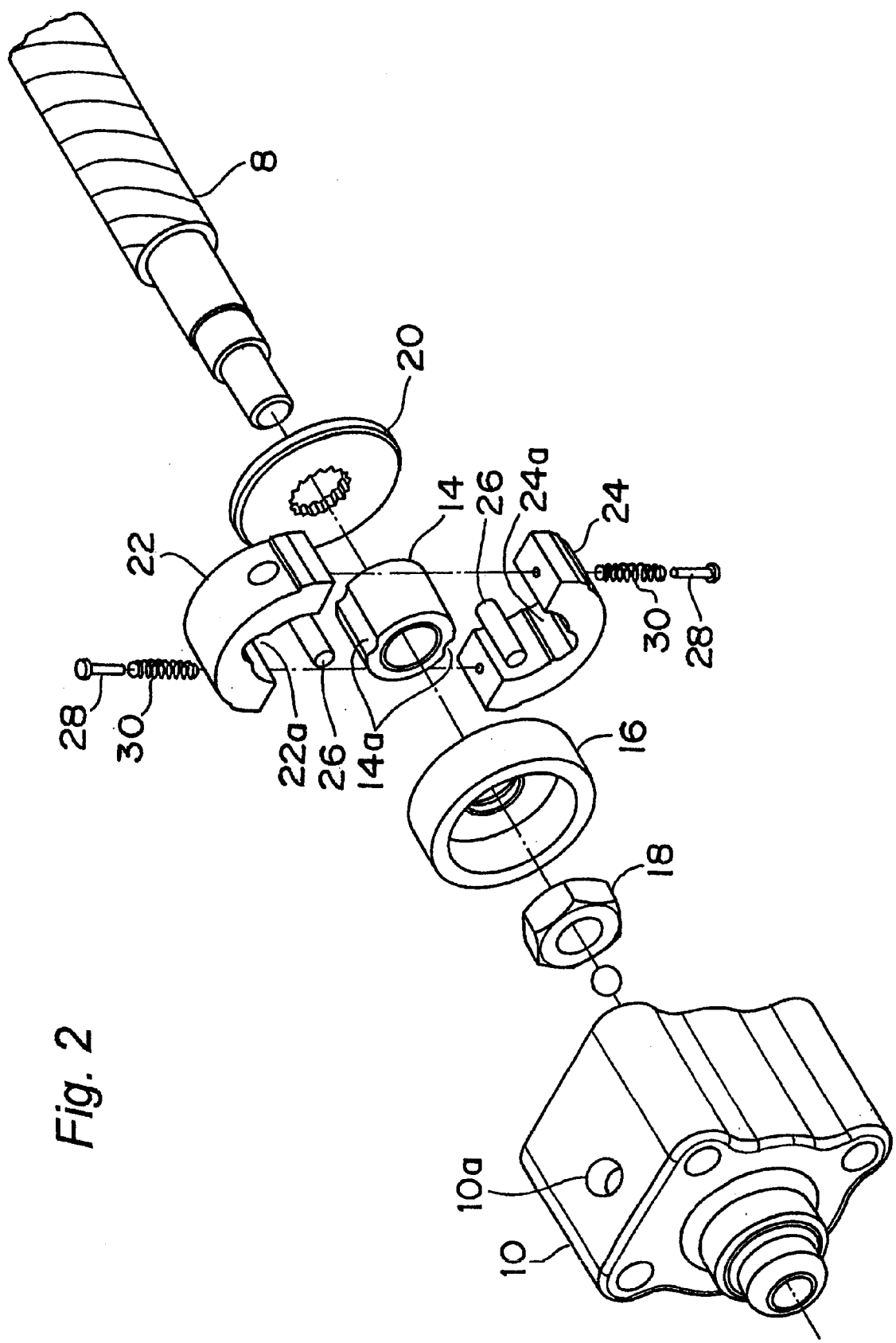
FIG. 2 is an exploded perspective view of an emergency locking means provided in the stepless slide adjuster of FIG. 1.
Figure 3:
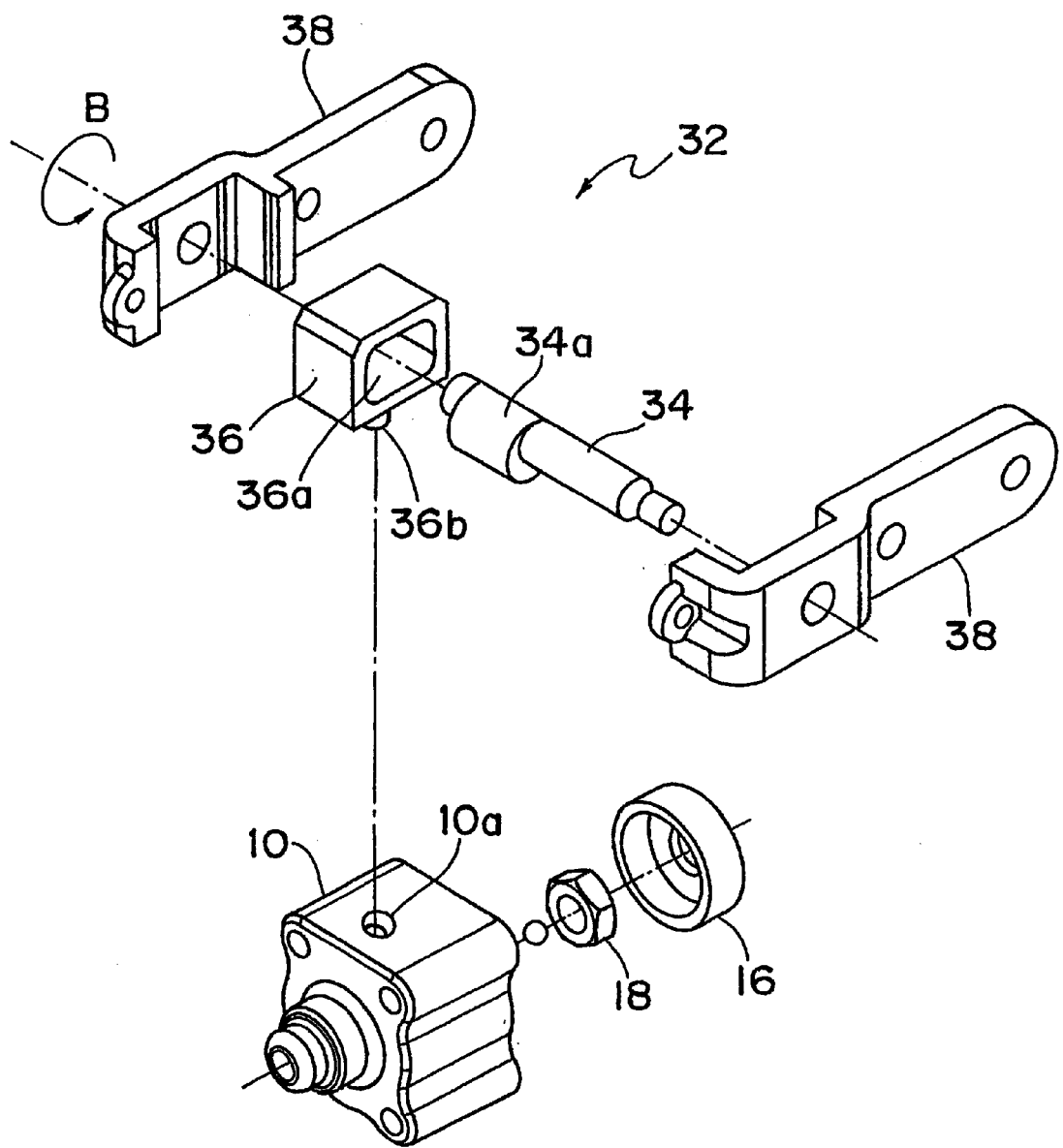
FIG. 3 is an exploded perspective view of a manual locking means provided in the stepless slide adjuster of FIG. 1.

FIGS. 1 to 3 show a stepless slide adjuster A having a safety lock in accordance with the present invention, which can be attached to a seat of a vehicle for example, so that the position of the seat in the longitudinal direction of the vehicle can be adjusted swiftly and steplessly, and the seat can be emergency-locked when an acceleration exerted to the vehicle body exceeds a predetermined value.

The stepless slide adjuster A includes a lower rail 2, which is attached to the vehicle body, and an upper rail 4, which is slidable against the lower rail 2 and is attached to a seat (not shown).

A drive nut 6 is attached to a center portion of the lower rail 2, and a slide screw 8, which is screwed into the drive nut 6, is accommodated rotatably inside the upper rail 4. The front end of the slide screw 8 is supported rotatably by a brake drum 10, which also serves as a front bearing. The rear end of the slide screw 8 is supported rotatably by a rear bearing 12.

The lead angle of the drive nut 6 and the slide screw 8 is set to be larger than the friction angle, and when a load is applied to the upper rail 4 in the longitudinal or fore-and-aft direction, the slide screw 8 rotates with respect to the drive nut 6, and the relative position between the lower rail 2 and the upper rail 4 changes.

At the front end of the slide screw 8, a generally cylindrical cam 14 and a rake ring 16 are sandwiched and held between a nut 18 and a washer 20. The cam 14 is surrounded by two brake shoes 22 and 24 having the same shape. The two brake shoes 22 and 24 together are of circular shape, and their internal diameter is the same as the outer diameter of the cam 14.

Furthermore, indentations 14a and 14a are provided at two positions in the outer surface of the cam 14 that are spaced 180° apart, and indentations 22a and 24a are provided similarly at the inner surfaces of the two brake shoes 22 and 24, in opposition to these indentations 14a and 14a. Rollers 26 and 26 are accommodated in the spaces formed by the two opposing indentations 14a and 22a and the two opposing indentations 14a and 24a. The brake shoes 22 and 24 are biased towards the cam 14 by coil springs 30, which are attached with screws 28, and accommodated inside the brake drum 10 together with the brake ring 16.

As shown in FIG. 3, a manual locking means or device 32 is disposed above the brake drum 10. The manual locking means 32 includes a cam shaft 34 having a cam 34a, a locking member 36 which moves up and down following the rotation of the cam 34a and has an aperture portion 36a in which the cam 34a is accommodated, and a pair of brackets 38 and 38 which support the cam shaft 34 so that it can be rotated, and also support the locking member 36 so that it can be moved up and down. The brackets 38, 38 are screwed to the upper rail 4. A locking projection or locking pin 36b for frictionally engaging with the brake ring 16 is formed at the lower face of the locking member 36. This locking pin 36b is loosely inserted into a circular hole 10a defined in the upper wall of the brake drum 10. The cam shaft 34 is coupled to a manual operating lever (not shown), and biased in the direction of an arrow B by a biasing means (not shown), such as a spring, so that the locking member 36 is constantly pushed downward.

Figure 4:
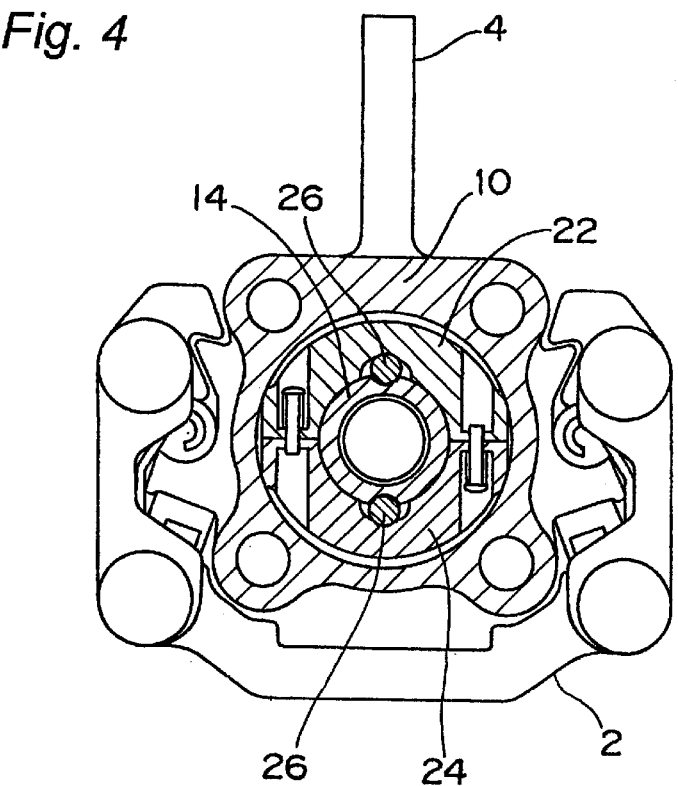
FIG. 4 is a vertical cross-sectional view of the stepless slide adjuster in the normal position when the emergency locking means is not in operation.
Figure 5:
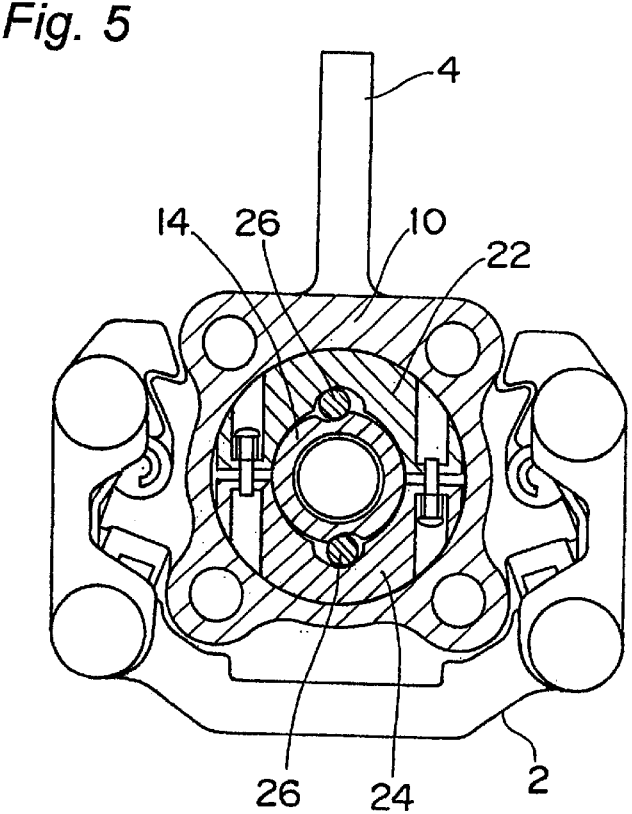
FIG. 5 is a vertical cross-sectional view of the stepless slide adjuster when the emergency locking means is in operation.

The operation of the stepless slide adjuster A having a safety lock with this configuration of the present invention is explained with reference to FIGS. 4 and 5.

In the normal position, in which the operating lever is not operated, the biasing means attached to the cam shaft 34 pushes the locking member 36 down via a protrusion on the cam 34a, and the locking pin 36b at the lower face of the locking member 36 frictionally engages with the outer surface of the brake ring 16 through the circular hole 10a of the brake drum 10, thereby impeding the rotation of the brake ring 16. The brake ring 16 is held integrally with the front end of the slide screw 8, and because the rotation of the slide screw 8 is impeded as well, the relative position between the upper rail 4 and the lower rail 2 does not change, so that the upper rail 4 and the seat mounted thereon are held in their current position.

To change the position of the seat, the operating lever is operated to rotate the cam shaft 34 opposite to the direction of the arrow B in FIG. 3, which moves the protrusion of the cam 34a upward. As a result, the locking member 36 is raised, and the frictional engagement between the locking pin 36b and the brake ring 16 is released, so that the slide screw 8 becomes freely rotatable, as shown in FIG. 4.

Because the lead angle of the drive nut 6 and the slide screw 8 held in engagement with each other is set to be larger than the friction angle, the slide screw 8 rotates when a load is applied through the seat in the fore-and-aft direction on the upper rail 4, and the upper rail 4 moves in the fore-and-aft direction with respect to the lower rail 2. Letting the operating lever go at a desired position, the cam shaft 34 rotates in the direction of the arrow B, due to the biasing force of the biasing means. As a result, the protrusion on the cam 34a moves downward and pushes the locking member 36 down, so that the locking pin 36b again frictionally engages with the outer surface of the brake ring 16, and the rotation of the slide screw 8 is impeded, holding the upper rail 4 in position.

On the other hand, the operation for the unlocked state, in which the operation lever is being operated and the frictional engagement between the locking pin 36b and the brake ring 16 is released, in emergencies, such as when the vehicle collides and its acceleration exceeds a predetermined value, is explained with reference to FIG. 5.

In the unlocked state, when a load is applied to the upper rail 4 in the fore-and-aft direction and the slide screw 8 is rotated with an acceleration or speed that exceeds a predetermined value, the cam 14 and the brake shoes 22 and 24 rotate together. In this situation, the brake shoes 22 and 24 spread outward in the radial direction, against the elastic force of the coil springs 30 and 30, until they abut the inner surface of the brake drum 10, as shown in FIG. 5, thereby halting the rotation. As a result, the rotation of the slide screw 8 is halted as well, through the rollers 26, 26 and the cam 14, so that a relative movement between the upper rail 4 and the lower rail 2 is impeded, and the seat is held in its current position.

More specifically, when the slide screw 8 rotates with a rotational acceleration that exceeds a predetermined value, the inertial mass of the brake shoes 22 and 24 exerts a counter force on the brake shoes 22 and 24 working against the rotation. Therefore, the relative position of the cam 14 and the brake shoes 22 and 24 changes, and the rollers 26 rotate slightly along the oblique surfaces of the indentations 14a, 22a and 24a provided in the cam 14 and the two brake shoes 22 and 24. As a result, the brake shoes 22 and 24 spread, their outer surfaces abut the inner surface of the brake drum 10, and the slide screw 8 locks.

When the slide screw 8 rotates with a rotation speed that exceeds a predetermined value, then the brake shoes 22 and 24 spread due to the centrifugal force, their outer surfaces abut the inner surface of the brake drum 10, and the slide screw 8 locks.

The critical rotational acceleration and rotational speed of the slide screw 8 can be set by choosing the mass of the brake shoes 22 and 24, and the elastic force of the coil springs 30 biasing the brake shoes 22 and 24 appropriately.

If in this embodiment serrations (i.e., a plurality of grooves in axial direction) are formed in the outer surface of the brake ring 16 that is part of the manual locking means 32, and the end face of the locking pin 36b of the locking member 36 that frictionally engages with the outer surface of the brake ring 16 has a shape that corresponds to these serrations, then the manual locking of the slide screw 8 can be made even more effective.

A slide adjuster A with this configuration can be applied not only to seats for vehicles, but also to any device having a first and a second member which can move relatively to each other, where an emergency lock between the first member and the second member is necessary.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A stepless slide adjuster having a safety lock, comprising:

a first member and a second member, which can move relatively to each other;

a nut fastened to the first member;

a screw rotatably attached to the second member and screwed into the nut;

a manual locking device for manually locking the screw; and an emergency locking device comprising a brake drum and brake shoes for emergency locking the screw;

wherein a lead angle of the nut and the screw is larger than a friction angle therebetween, and when locking with the manual locking device is released, and the screw rotates with an acceleration or a speed that exceeds a predetermined value, then the brake shoes spread and frictionally engage the brake drum, thereby impeding a relative movement between the first member and the second member.

2. The stepless slide adjuster according to claim 1, further comprising a cam fastened to the screw, wherein the brake shoes are caused to spread out by way of the cam.

3. The stepless slide adjuster according to claim 2, further comprising a plurality of rollers arranged between the brake shoes and the cam.

4. The stepless slide adjuster according to claim 1, wherein the manual locking device comprises a brake ring fastened to the screw, and a locking member for frictionally engaging with the brake ring.

5. The stepless slide adjuster according to claim 2, wherein the manual locking device comprises a brake ring fastened to the screw, and a locking member for frictionally engaging with the brake ring.

6. The stepless slide adjuster according to claim 3, wherein the manual locking device comprises a brake ring fastened to the screw, and a locking member for frictionally engaging with the brake ring.

* * * * *